(12) United States Patent
Ahmed et al.

(10) Patent No.: US 8,046,481 B2
(45) Date of Patent: Oct. 25, 2011

(54) PEER-TO-PEER NETWORK COMMUNICATIONS USING SATA/SAS TECHNOLOGY

(75) Inventors: Ali U. Ahmed, Macungie, PA (US); Gregory W. Sheets, Breinigsville, PA (US); Lane A. Smith, Easton, PA (US); David W. Thompson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 12/610,462

(22) Filed: Nov. 2, 2009

(65) Prior Publication Data
US 2010/0049896 A1    Feb. 25, 2010

Related U.S. Application Data

(63) Continuation of application No. 11/444,845, filed on May 31, 2006, now abandoned.

(60) Provisional application No. 60/779,953, filed on Mar. 7, 2006.

(51) Int. Cl.
    *G06F 15/16*      (2006.01)
(52) U.S. Cl. ........................ 709/230; 711/200
(58) Field of Classification Search .................... 709/230
See application file for complete search history.

(56) References Cited

U.S. PATENT DOCUMENTS

| | | | | |
|---|---|---|---|---|
| 6,160,796 A * | 12/2000 | Zou | ................................ | 370/257 |
| 6,807,600 B2 * | 10/2004 | Bissessur et al. | ............. | 710/313 |
| 6,853,573 B2 * | 2/2005 | Kim et al. | ....................... | 365/63 |
| 7,284,082 B2 * | 10/2007 | Greenberger | ................. | 710/312 |
| 7,447,833 B2 * | 11/2008 | Burroughs et al. | ............ | 711/112 |
| 7,836,351 B2 * | 11/2010 | Maharana et al. | .............. | 714/43 |
| 2004/0010612 A1 * | 1/2004 | Pandya | ........................ | 709/230 |
| 2005/0027900 A1 * | 2/2005 | Pettey | ............................. | 710/22 |
| 2005/0165786 A1 * | 7/2005 | Ahmed et al. | .................. | 707/10 |
| 2005/0235072 A1 * | 10/2005 | Smith et al. | ..................... | 710/22 |
| 2006/0039405 A1 * | 2/2006 | Day et al. | ....................... | 370/469 |
| 2006/0039406 A1 * | 2/2006 | Day et al. | ....................... | 370/469 |
| 2006/0041672 A1 * | 2/2006 | Day et al. | ....................... | 709/230 |
| 2006/0041699 A1 * | 2/2006 | Day et al. | ....................... | 710/106 |
| 2006/0173976 A1 * | 8/2006 | Vincent et al. | ................ | 709/220 |
| 2009/0135256 A1 * | 5/2009 | Komori | ....................... | 348/207.1 |

OTHER PUBLICATIONS

Frank Vahid, The Softening of Hardware, Computer, vol. 36, No. 4, pp. 27-34, Apr. 2003, doi:10.1109/MC.2003.1193225.*
Steve McConnell, "Who Needs Software Engineering?," IEEE Software, vol. 18, No. 1, pp. 5-8, Jan./Feb. 2001, doi:10.1109/MS.2001.903148.*
Andrew Tanenbaum, Structured computer organization; (2nd ed.), Prentice-Hall, Inc., Upper Saddle River, NJ, 1984.*
"Serial ATA Specification Rev. 2.5 Gold" (Oct. 27, 2005) (Copyright 2002-2005) to Serial ATA International Organization. ("SATA-IO").*

(Continued)

*Primary Examiner* — Phuoc Nguyen
*Assistant Examiner* — June Sison
(74) *Attorney, Agent, or Firm* — Mendelsohn, Drucker & Associates, P.C.; Steve Mendelsohn

(57) ABSTRACT

A conventional serial communications protocol that is limited to supporting only host-to-slave communications, such as SATA or SAS, is extended to support peer-to-peer communications, e.g., by adding a memory-map layer into the conventional protocol stack between the link layer and the protocol layer. The addition of the memory-map layer enables two (or more) non-host devices (i.e., peer devices) to communicate with one another without using a host computer and without relying on conventional protocol-bridging techniques.

9 Claims, 5 Drawing Sheets

OTHER PUBLICATIONS

"Information technology—SCSI Architecture Model—3 (SAM-3)" (Sep. 21, 2004) to T10, Technical Committee of Accredited Standards Committee INCITS (InterNational Committee for Information Technology Standards). ("T10").*

"*Hard Disk Drives: The Transition to Serial Interfaces*," HP ISS Technology Update, The Newsletter for HP Certified Professionals, vol. 3, No. 2, Feb. 2004, 3 pages.

"*Hewlett Packard Technology Brief,*" TC050303TB, Mar. 2005, 9 pages.

Office Action dated Oct. 28, 2008 from US Appl. No. 11/444,845.

Final Office Action dated Feb. 13, 2009 from U.S. Appl. No. 11/444,845.

Office Action dated Aug. 3, 2009 from U.S. Appl. No. 11/444,845.

* cited by examiner

PEER-TO-PEER NETWORK COMMUNICATIONS USING SATA/SAS TECHNOLOGY

CROSS-REFERENCE TO RELATED APPLICATIONS

This application is a continuation of U.S. application Ser. No. 11/444,845, filed on May 31, 2006, which claimed the benefit of the filing date of U.S. Provisional Application No. 60/779,953, filed on Mar. 7, 2006, the teachings of both of which are incorporated herein by reference.

BACKGROUND OF THE INVENTION

1. Field of the Invention

The present invention relates to communication networks, and, in particular, to nodes of a computer network that communicate using SATA and/or SAS protocols.

2. Description of the Related Art

IEEE 1394 (also referred to by the tradename FireWire) is a communication protocol standard for high-performance serial buses, that has gained popular use by providing mechanisms to interconnect home appliances, such as audio devices, video devices, scanners, printers, and computers. The IEEE 1394 standard is available from Institute of Electrical and Electronics Engineers, Inc., 3 Park Avenue, 17$^{th}$ Floor, New York, N.Y. 10016.

The original IEEE 1394 standard has evolved over the last decade into versions 1394a and 1394b, where IEEE 1394b requires that devices maintain backward compatibility to previous versions of the IEEE 1394 standard (e.g., IEEE 1394a). IEEE 1394 and 1394a devices operate at data rates of 100, 200, and 400 Mbps using data-strobe encoding, while IEEE 1394b devices operate at 400, 800, and 1600 Mbps with the clock embedded in the data. For backward compatibility, IEEE 1394b devices are also required to operate at 100, 200, and 400 Mbps using data-strobe encoding. Backward compatibility for IEEE 1394b devices requires relatively complex implementation, with increased number of gates and complex logic in the physical (PHY) layer portion of the standard.

FIG. 1 represents the data connections conforming to the IEEE 1394 standard for bidirectional communications between two device nodes (Nodes A and B) of a home network. As shown in FIG. 1, each node has an IEEE 1394-compliant port 102 having two interfaces (i.e., Twisted Pair A (TPA) and Twisted Pair B (TPB)), each interface supporting differential signaling over a different pair of wires (i.e., twisted-wire pair 104 and twisted-wire pair 106). In particular, data is transmitted via twisted pair 104 from the TPA interface of Node A to the TPB interface of Node B, while data is transmitted via twisted pair 106 from the TPA interface of Node B to the TPB interface of Node A, thereby providing two half-duplex connections for full, bidirectional communications between Nodes A and B. As indicated in FIG. 1, each node may have additional IEEE 1394-compliant ports, each having a TPA interface and a TPB interface.

Many home networks currently employ peripheral devices, such as hard-disk drives and/or other mass-storage devices such as magnetic/optical/flash memory, that use the Serial Advanced Technology Attachment (SATA) protocol and/or the Serial Attached SCSI (SAS) protocol as the communication protocol between the network's host processor and the peripheral devices. The operating data rates for SATA/SAS devices are at 1.5 Gbps and 3 Gbps. The SATA and SAS protocols are limited to host-to-peer communications.

Currently, some mass-storage products, such as hard-disk drives, employ a hybrid IEEE 1394 and parallel ATA protocol that requires a "bridge" chip to map IEEE 1394 protocol-based communications to ATA protocol-based data transfer and memory mapping at the hard-disk drives.

SUMMARY OF THE INVENTION

In one embodiment, the present invention is a method for extending the functionality of a first device. The method comprises providing an existing protocol having an existing protocol stack consisting of (i) one or more lower-level stack layers and (ii) one or more higher-level stack layers above the one or more lower-level layers, wherein, if the first device were configured with the existing protocol, then the first device would be in a host-to-slave configuration with an other device configured with the existing protocol. A memory-map layer is added to the existing protocol stack of the existing protocol, above the one or more lower-level stack layers and below the one or more higher-level stack layers to form a new protocol stack of a new protocol. The first device is configured with the new protocol, such that, when the other device is configured with the new protocol: (i) the first device is a peer in a peer-to-peer configuration via a link with the other device being another peer in the peer-to-peer configuration; (ii) the first device supports peer-to-peer communication via the link with the other device without using a protocol-bridging technique; and (iii) neither the first device nor the other device is a host device.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

SATA and SAS are serial protocols derived from the parallel ATA (Advanced Technology Attachment) and SCSI (Small Computer System Interface) protocols, respectively.

The SAS protocol defines a Physical layer, a PHY layer, a Link Layer, a Port layer, a Transport layer, and an Application Layer. The Physical Layer comprises two sets of differential lines: one receive set and one transmit set, for a total of four wires. The PHY Layer connects the differential transmitter and receiver circuits (ICs) to the Physical Layer, which defines the cable, connector, and transceiver (transmitter/receiver) characteristics. The external connector accepts four physical links, while the cable may hold between 1 and 4 physical links. Internal connectors are also defined. Two data rates are defined: 1.5 Gbps and 3.0 Gbps over a 100-ohm (+/−15 ohms) differential impedance cable. SAS uses the SATA physical interface, including the connector receptacle and connector plugs.

The SATA protocol is the serial version of the ATA specification. SATA uses a four-conductor cable with two differential pairs (Tx/Rx), plus an additional three ground pins and a separate power pin. Data runs at 150 MBps (1.5 GHz) using 8B/10B encoding, with a maximum bus length of 1 meter. Later enhancements moved the data transfer speed to 300 MBps (3.0 Gbps), then 600 MBps (6.0 Gbps).

SATA is a point-to-point interface, where each device is directly connected to the host via a dedicated link. The bit encoding used in SATA is Non Return to Zero (NRZ) encoding for data communication on a differential two-wire bus. The use of NRZ encoding ensures compact messages with a minimum number of transitions and high resilience to external disturbance. The termination resistor is 100-ohm (+/−5 ohms) differential. SATA uses only four signal pins, improving pin efficiency over the parallel ATA interface which uses 26 signal pins going between devices (e.g., over an 80-conductor ribbon cable onto a 40-pin header connector). SATA also provides the opportunity for devices to be "hot-plugged," where devices are inserted or removed while the system is powered on. SATA uses a 32-bit CRC (calculated over the contents of a Frame Information Structure (FIS)).

Figure 2:
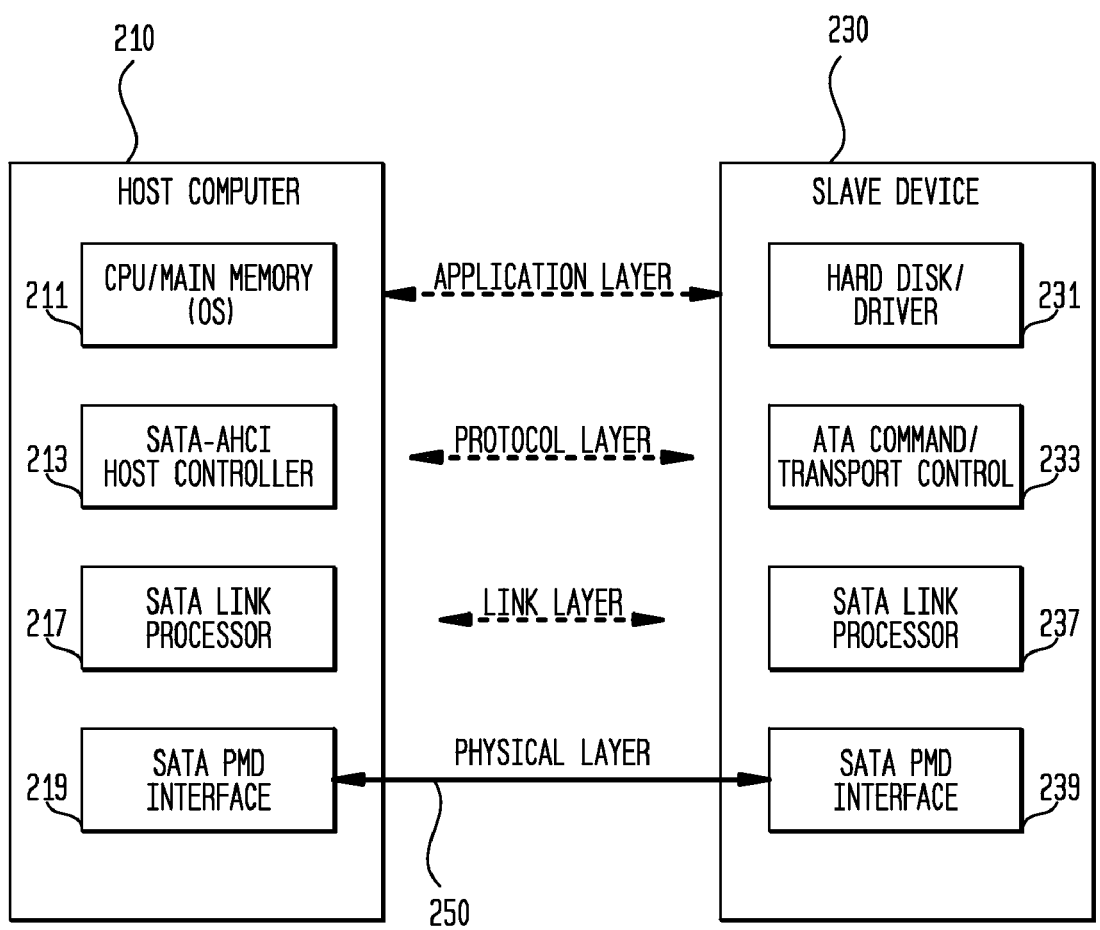
FIG. 2 is a component-level block diagram of a conventional SATA-compliant host-to-slave configuration between a host computer and a slave hard-disk drive device.

FIG. 2 is a component-level block diagram of a conventional SATA-compliant host-to-slave configuration between a host computer 210 and a slave hard-disk drive device 230. As shown in FIG. 2, host computer 210 includes a central processing unit (CPU) 211 having an associated main memory and running a suitable operating system (OS), while slave device 230 includes a hard disk and its associated driver (231). In addition, host computer 210 includes SATA-AHCI (Advanced Host Controller Interface) host controller 213, SATA link processor 217, and SATA PMD (physical medium device) interface 219, while slave device 230 also includes ATA command/transport controller 233, SATA link processor 237, and SATA PMD interface 239, all of which are provided to support SATA-compliant communications between host computer 210 and slave device 230 via serial link 250 to enable CPU 211 to write data to and read data from hard disk 231. Note that the SATA link processors in the host and slave devices can be implemented using identical hardware and/or software, and that the SATA PMD interfaces in the host and slave devices can also be implemented using identical hardware and/or software. At the protocol layer, however, the implementation of ATA command/transport controller 233 in the slave device can be much less complicated than the implementation of SATA-AHCI host controller 213 in the host computer. For example, the SATA-AHCI host controller may contain multiple DMA (direct memory access) controllers and relatively large FIFO (first-in, first-out) buffers that are not included in the ATA command/transport controller.

Figure 3:
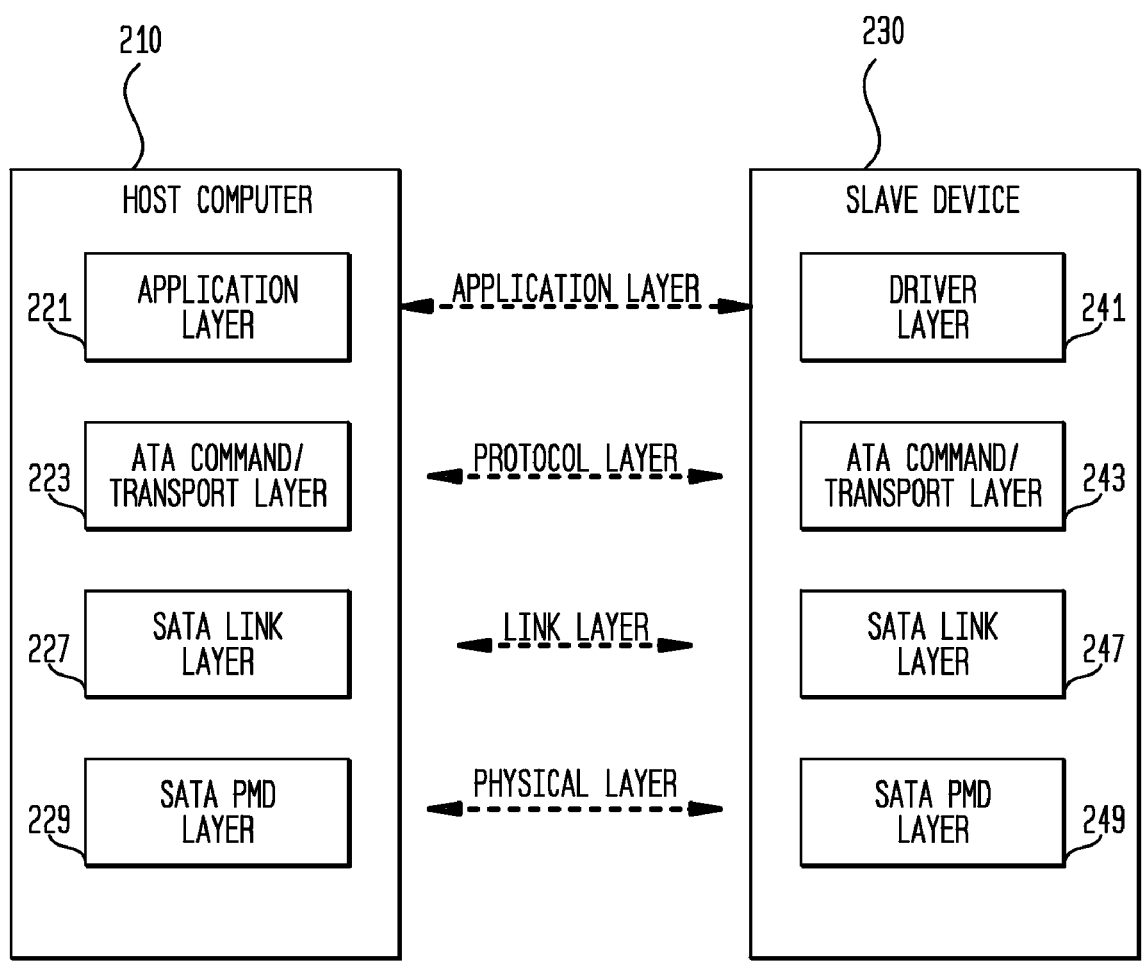
FIG. 3 is a stack diagram showing the layers of the SATA protocol stacks for the host computer and the slave device of FIG. 2.

FIG. 3 is a stack diagram showing the layers of the SATA protocol stacks for host computer 210 and slave device 230 of FIG. 2. As shown in FIG. 3, the SATA protocol stack for host computer 210 includes application layer 221 (running under the operating system of CPU 211 of FIG. 2), ATA command/transport layer 223 (handled by SATA-AHCI host controller 213 of FIG. 2), link layer 227 (handled by link processor 217 of FIG. 2), and PMD layer 229 (handled by PMD interface 219 of FIG. 2). Similarly, the SATA protocol stack for slave device 230 includes driver layer 241 (handled by driver 231 of FIG. 2), ATA command/transport layer 243 (handled by ATA command/transport controller 233 of FIG. 2), link layer 247 (handled by link processor 237 of FIG. 2), and PMD layer 249 (handled by PMD interface 239 of FIG. 2). As represented in FIG. 3, the SATA PMD layer includes both the SATA Physical layer and the SATA PHY layer. Similarly, the SATA link layer represented in FIG. 3 includes both the SATA link layer and the SATA port layer.

The conventional SATA protocol is limited to host-to-slave communications, such as those between a network's host processor and one or more peripheral slave devices, such as a mass-storage device. In accordance with exemplary embodiments of the present invention, the conventional SATA protocol is modified to support peer-to-peer communications between two (or more) devices, where none of the devices is required to function as a host for another (i.e., slave) device, at least as far as those peer-to-peer communications are concerned.

As used in this specification, a host is defined to be a programmable device having an operating system that supports device programmability beyond a fixed set of pre-defined functions for that device. Examples of hosts include general-purpose microprocessors and field-programmable gate arrays (FPGAs) having embedded (hard or soft) microprocessors. In a conventional host-to-slave configuration, the host device has additional logic designed to support the communications with the slave device, such that the slave device is able to be implemented without such additional logic. Although not required, in a conventional peer-to-peer configuration, each peer device typically has substantially the same amount of logic designed to support the peer-to-peer communications.

By extending the SATA protocol to support peer-to-peer communications, the present invention enables communications between consumer electronics, such as camcorders, digital cameras, and digital video recorders, and mass-storage devices, such as hard-disk drives, without using a host device and without relying on conventional protocol-bridging techniques.

Figure 4:
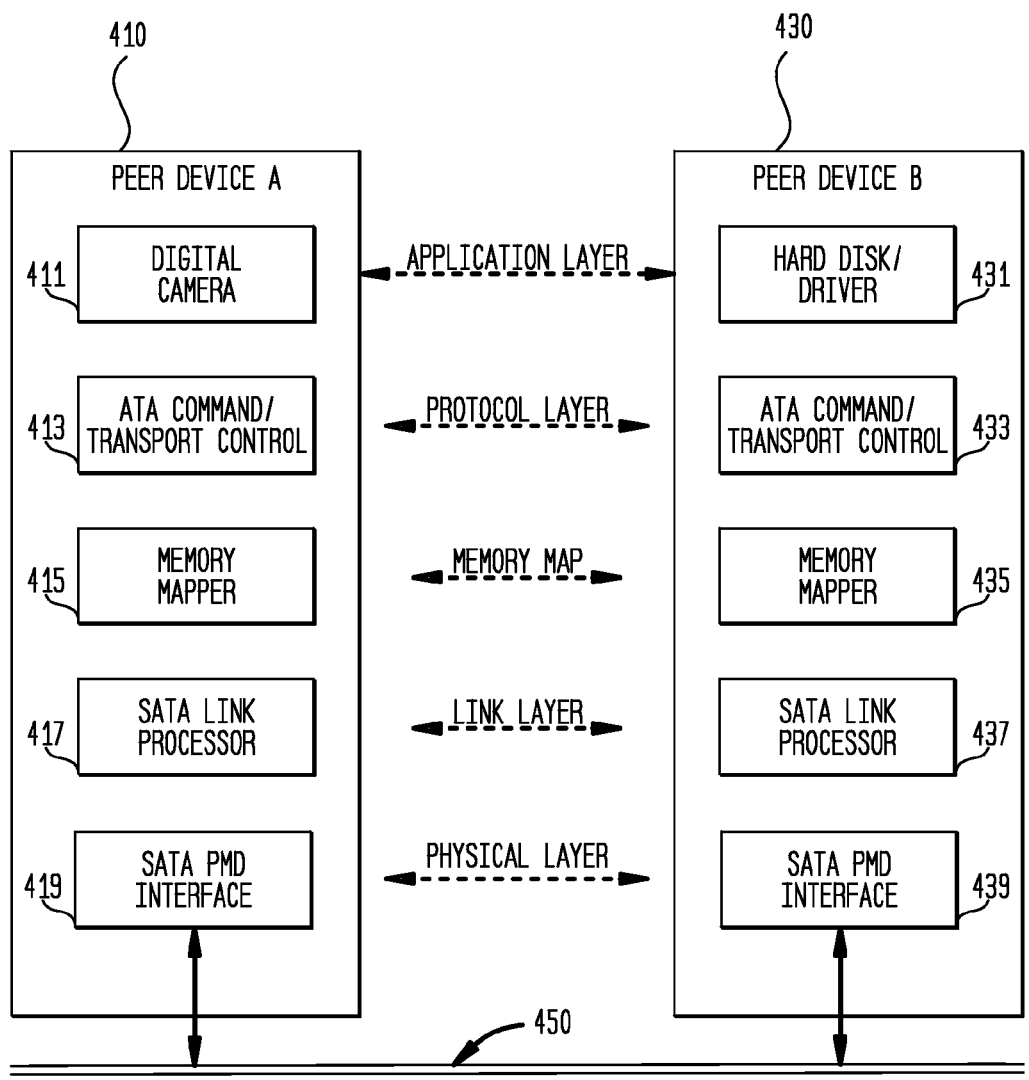
FIG. 4 is a component-level block diagram of an exemplary, "extended SATA" peer-to-peer configuration between a first peer device (in this example, a digital camera) and a second peer device (in this example, a hard-disk drive), according to one embodiment of the present invention.
Figure 5:
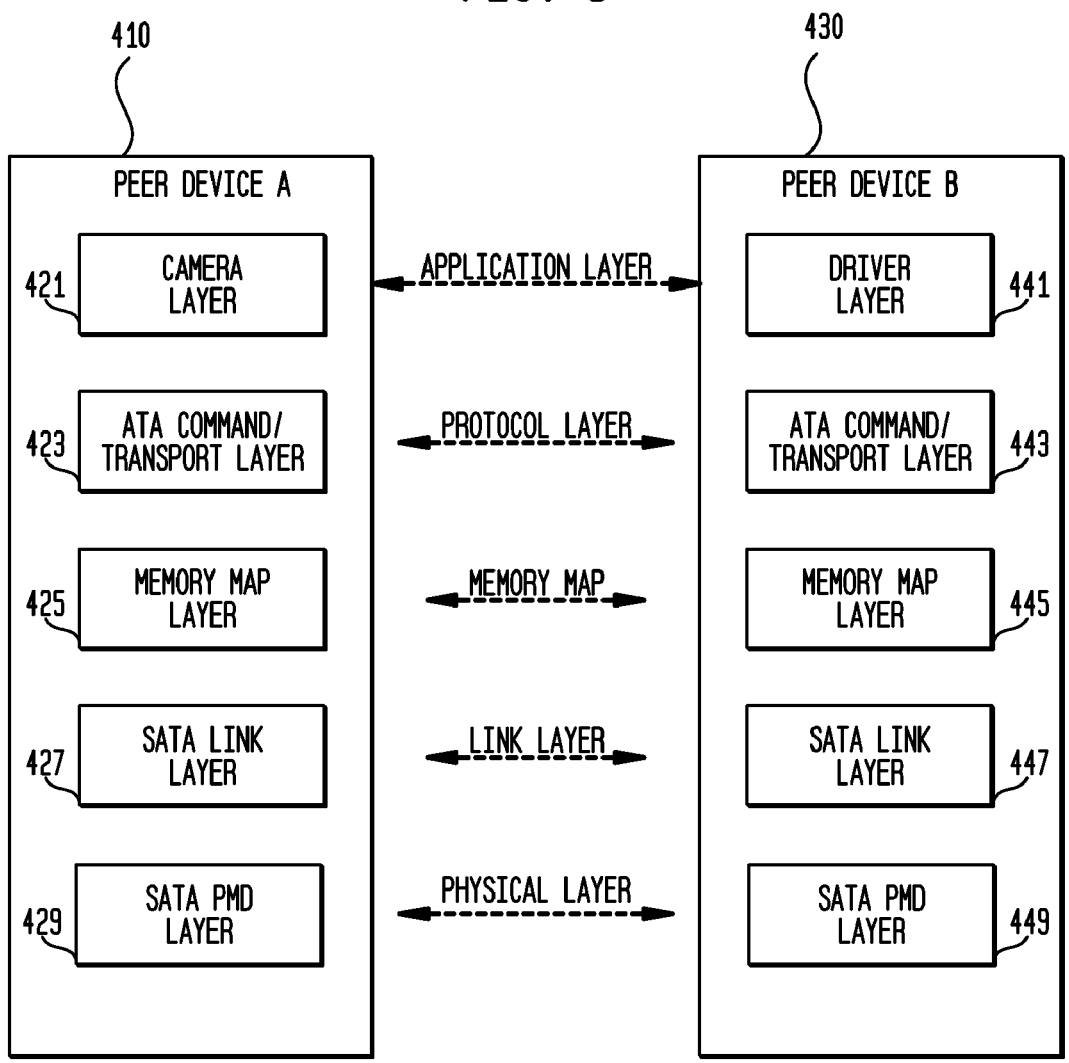
FIG. 5 is a stack diagram showing the layers of the "extended SATA" protocol stacks for the two peer devices of FIG. 4.

FIG. 4 is a component-level block diagram of an exemplary, "extended SATA" peer-to-peer configuration between a first peer device 410 (in this example, a digital camera) and a second peer device 430 (in this example, a hard-disk drive), according to one embodiment of the present invention, while FIG. 5 is a stack diagram showing the layers of the "extended SATA" protocol stacks for the two peer devices of FIG. 4. This embodiment of the present invention supports "extended SATA" communications between peer devices 410 and 430 via serial link 450 to enable digital camera 411 to write data to hard disk 431, without using a host device and without relying on conventional protocol-bridging techniques.

In FIG. 4, the components (i.e., 411, 413, 417, 419, 431, 433, 437, and 439) of peer devices 410 and 430 are analogous to those of slave device 230 of FIG. 2, with the addition of memory mappers 415 and 435, respectively, between the associated SATA link processor and ATA command/transport controller. Similarly, in FIG. 5, the stack layers (i.e., 421, 423, 427, 429, 441, 443, 447, and 449) of peer devices 410 and 430 are analogous to those of slave device 230 of FIG. 3, with the addition of memory map layers 425 and 445, respectively, between the associated SATA link layer and ATA command/transport layer. The addition of these memory mappers extends the conventional SATA protocol beyond only host-to-slave communications to support peer-to-peer communications, as in FIGS. 4 and 5.

Because the two devices in FIGS. 4 and 5 are peers, in addition to being able to implement their SATA link processors using identical (and conventional SATA) hardware/software and their SATA PMD interfaces using identical (and conventional SATA) hardware/software, the ATA command/transport controllers of the two devices can also be implemented using identical (and conventional SATA) hardware and/or software. In addition, the memory mappers for the two peer devices can be implemented using identical hardware and/or software.

The following paragraphs discuss some of the aspects that may be involved in extending the SATA protocol according to different implementations of the present invention.

Command set extensions are added to the SATA protocol, which extensions may be specific to the device type. For a device type, the extension identifies the device-unique commands associated with the device. These device-specific command sets are well-defined in International Electrotechnical Commission (IEC) 61833-x where x is an integer that identifies the device type. For instance, 61833-1 defines the generic command sets that may be applicable to all devices, 61833-4 defines the command sets for MPEG devices (through the Motion Picture Expert Group).

More device types might be added for isochronous transfers, such as for digital cameras, home entertainment A/V receivers, (multi-channel) speakers, home intercommunication systems, and home security systems. These device-type command set extensions might be added at the transport and link layers. These command set extensions do not require changes to the current transaction layer of the SATA (or SAS) protocol. Since these extensions are presently defined for the IEEE 1394 standard, these extensions might be derived from those already defined in IEEE 1394.

Since SATA is traditionally employed in host-based point-to-point communications, capability for support of peer-to-peer networking of nodes is introduced, where a node can be a root, a branch, or a leaf (parent-child). As indicated by representing link 450 in FIG. 4 as a bus, the entire network of devices can be a bus, where the devices are connected in a parent and child configuration (leaf devices do not have any child). A node can be either a network hub or a network switch/expander.

To support peer-to-peer networking, the SATA protocol stack at each peer device is modified by inserting a memory map layer between the link and protocol layers, to enable SATA devices to recognize multiple devices on a node. Use of multiple ports and multiple devices connected through a bus implies the addition of (i) source and destination addresses for devices and (ii) input/output port addressing. Consequently, user and node registers, memory space allocation, mapped data transfer, and a direct memory access (DMA) engine are also implemented at the memory map layer. In some embodiments of the present invention, specifications for these modifications might be ported from the IEEE 1394 standard, though this functionality might be incorporated from another standard or independently developed. In addition, a port and/or bus arbitration capability may need to be added to the SATA Physical layer. In general, to support port and/or bus arbitration, the overall protocol stack supports bus management through complete arbitration, bus fairness, and transmission sequencing.

Since some devices connected to a network may require that data must be delivered within certain time constraints, SATA provides for isochronous transport by throughput guarantees. For example, multi-media streams of video or audio devices might require an isochronous transport mechanism to ensure that data is delivered as fast as it is displayed and to ensure that the audio is synchronized with the video. In addition, full duplex as supported by SATA can be utilized for efficient arbitration and data transaction. Most importantly, using an "extended SATA" protocol with native (SATA) hard drives in A/V C and storage devices eliminates the need for conventional protocol-bridging techniques between the network and the storage devices, as is currently necessary with IEEE 1394.

Figure 1:
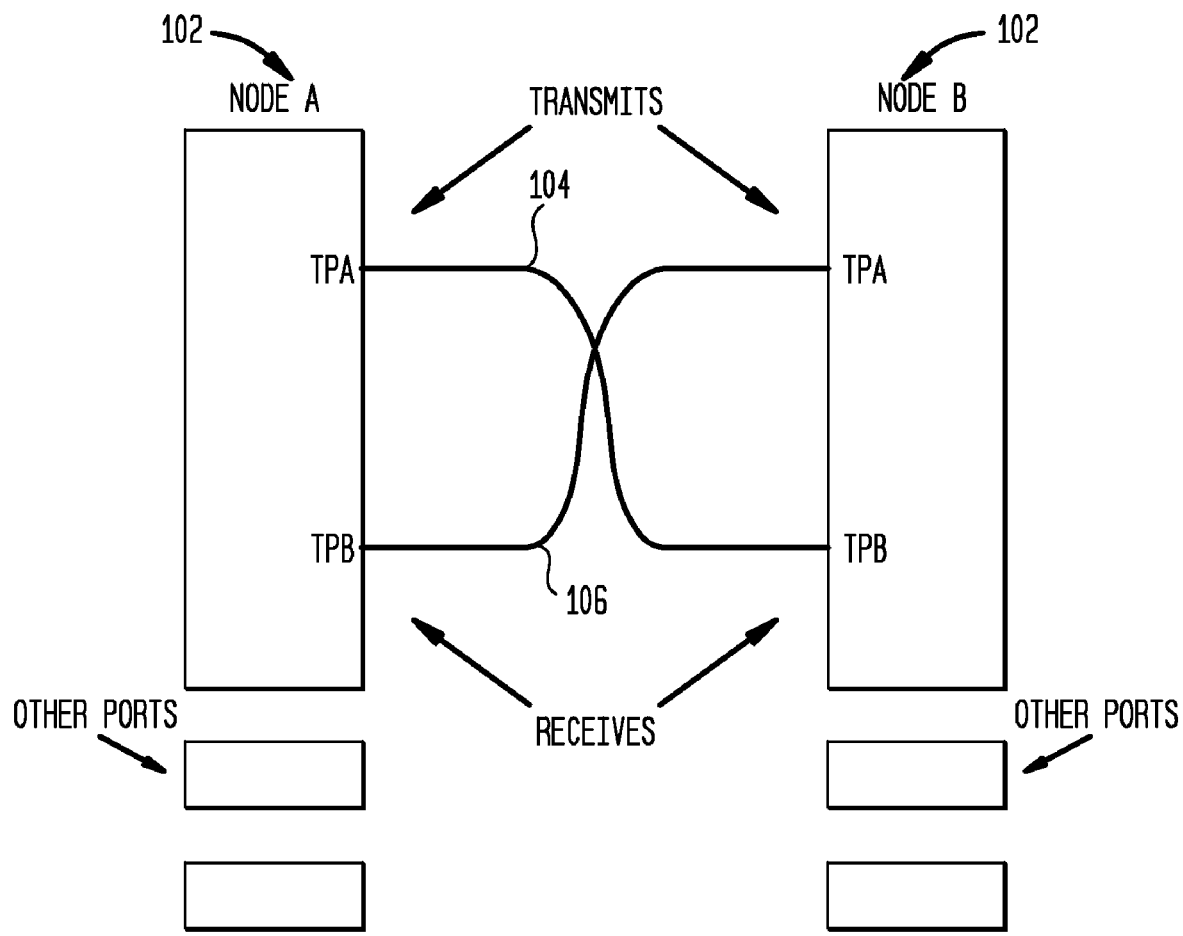
FIG. 1 represents the data connections conforming to the IEEE 1394 standard for bidirectional communications between two device nodes of a home network.

At the physical-layer level, proposed modifications to SATA for a wired network provide a differential transmitter and receiver for each port, similar to that illustrated in FIG. 1, to provide full duplex connection between each pair of nodes. The bus arbitration and data transmission occurs in the network between two ports of two connected nodes through the connection to the parents and children.

In addition to an extended SATA protocol employed for wired communication as described above, SATA might also be extended for use with wireless local area network physical and lower-layer data link protocols. Thus, connectivity between the A/V C devices might be in accordance with an 802.11 a/b/g/e/n WiFi communication standard. In such case, the SATA physical layer and PHY layer specifications might be replaced with corresponding 802.11 a/b/g/e/n physical layer and PHY layer specifications.

The present invention allows using the current architecture and infrastructure of SATA technology in A/V C devices. It allows SATA to be used in non-host-based environments, where each node communicates with other nodes via its parent, thus providing peer-to-peer communication. This creates a SATA bus/peer-to-peer network. It provides a single type of physical connector for these devices. It allows communicating at 1.5 Gbps and 3 Gbps without having the burden of backward compatibility, thus reducing the number of gates and the complexity in logic and circuitry, hence providing increased cost effectiveness. It provides an extension to SATA technology providing native support to storage devices (SATA), while eliminating the cost of bridges.

Although the present invention has been described in the context of SATA technology, the present invention can also be implemented in other contexts, such as in the context of SAS technology to provide an "extended SAS" protocol.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for extending a conventional Serial Advanced Technology Attachment (SATA)/Serial Attached SCSI (SAS) protocol for a first hardware device, the method comprising:
   (a) providing the conventional SATA/SAS protocol having a conventional SATA/SAS protocol stack consisting of:
      (i) one or more lower-level stack layers; and
      (ii) one or more higher-level stack layers above the one or more lower-level stack layers, wherein configuring the first hardware device with the conventional SATA/SAS protocol would enable the first hardware device to be in a host-to-slave configuration with an other hardware device configured with the conventional SATA/SAS protocol;
   (b) adding, to the conventional SATA/SAS protocol stack of the conventional SATA/SAS protocol, a memory-map layer above the one or more lower-level stack layers and below the one or more higher-level stack layers to form a modified SATA/SAS protocol stack of a modified SATA/SAS protocol; and
   (c) configuring the first hardware device with the modified SATA/SAS protocol, such that, when the other hardware device is configured with the modified SATA/SAS protocol:
      the first hardware device is a peer in a peer-to-peer configuration via a link with the other hardwared device being another peer of the peer-to-peer configuration;
      the first hardware device supports peer-to-peer communication via the link with the other hardware device without using a protocol-bridging technique; and
      neither the first hardware device nor the other hardware device is a host device, wherein:
         the one or more lower-level stack layers comprise a physical medium device (PMD) layer and a link layer, whereby the memory-map layer is above the link layer;
         the one or more higher-level stack layers comprise a command/transport layer and an application layer;
         neither the first hardware device nor the other hardware device is a programmable device having an operating system that supports programmability beyond a fixed set of pre-defined functions for said hardware device;
         implementation of at least one component of the first hardware device that handles signal processing at one of the one or more higher-level stack layers is identical to implementation of a corresponding component of the other hardware device;
         the link is a serial link that functions as a bus;
         the first hardware device concurrently supports peer-to-peer communication via the link with one or more other hardware devices configured with the modified SATA/SAS protocol;
         each hardware device comprises a component for each lower-level stack layer, the memory-map layer, and each higher-level stack layer.

2. The method of claim 1, wherein the conventional SATA/SAS protocol is SATA.

3. The method of claim 1, wherein the conventional SATA/SAS protocol is SAS.

4. The method of claim 1, wherein the link is a serial link.

5. The method of claim 1, wherein the link is a wired link.

6. The method of claim 1, wherein the link is a wireless link.

7. The method of claim 1, wherein:
   the first hardware device concurrently supports peer-to-peer communication via the link with two or more other hardware devices configured with the modified SATA/SAS protocol.

8. A first hardware device generated using the method of claim 1.

9. A system comprising a first hardware device and an other hardware device, wherein the first hardware device is generated using the method of claim 1.

* * * * *